(12) United States Patent
An et al.

(10) Patent No.: US 9,850,913 B2
(45) Date of Patent: Dec. 26, 2017

(54) CENTRIFUGAL COMPRESSOR

(75) Inventors: Byeongil An, Tokyo (JP); Hiroshi Suzuki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 347 days.

(21) Appl. No.: 14/414,856

(22) PCT Filed: Aug. 24, 2012

(86) PCT No.: PCT/JP2012/071396
§ 371 (c)(1),
(2), (4) Date: Feb. 4, 2015

(87) PCT Pub. No.: WO2014/030248
PCT Pub. Date: Feb. 27, 2014

(65) Prior Publication Data
US 2015/0192147 A1    Jul. 9, 2015

(51) Int. Cl.
*F04D 27/02* (2006.01)
*F04D 29/44* (2006.01)
(Continued)

(52) U.S. Cl.
CPC ..... *F04D 29/441* (2013.01); *F02M 35/10157* (2013.01); *F02M 35/10262* (2013.01);
(Continued)

(58) Field of Classification Search
CPC ........ F02M 35/10262; F02M 35/10157; F04D 29/44; F04D 29/685; F04D 29/4213
(Continued)

(56) References Cited

U.S. PATENT DOCUMENTS 1,931,692 A    10/1933   Good et al.
4,743,161 A *   5/1988   Fisher ................. F04D 29/4213
                                               415/116
(Continued)

FOREIGN PATENT DOCUMENTS

CN    1542290 A    11/2004
CN    102428282 A    4/2012
(Continued)

OTHER PUBLICATIONS

Chinese Office Action and Search Report, dated Feb. 26, 2016, for corresponding Chinese Application No. 201280074538.6, with an English translation.

(Continued)

*Primary Examiner* — Umashankar Venkatesan
(74) *Attorney, Agent, or Firm* — Birch, Stewart, Kolasch & Birch, LLP (57) ABSTRACT

An object is to position a plurality of guide vanes for generating swirl flow at a housing inner circumferential side in front of an impeller wheel to improve a surge margin and to restrict the decrease in a choke flow rate, thereby increasing an operation range of a compressor. A compressor 19 includes a compressor housing 15, an impeller wheel 7 which compresses intake gas flowing in from an intake-air inlet 23, a swirl-flow generating part including a plurality of guide vanes 55 disposed circumferentially along an inner circumferential wall of the intake-air channel 21 between the intake-air inlet 23 and the impeller wheel 7 and which swirls the intake gas from the intake-air inlet 23 around the rotational axis, and a central intake-air flow path 59 formed inside the guide vanes 55 to allow intake gas to flow to the impeller wheel 7 without passing through the guide vanes 55.

9 Claims, 8 Drawing Sheets

(51) Int. Cl.
   F04D 29/42    (2006.01)
   F04D 29/68    (2006.01)
   F04D 17/10    (2006.01)
   F02M 35/10    (2006.01)

(52) U.S. Cl.
   CPC ......... *F04D 17/10* (2013.01); *F04D 29/4213* (2013.01); *F04D 29/444* (2013.01); *F04D 29/685* (2013.01); *F05D 2220/40* (2013.01); *F05D 2250/51* (2013.01); *Y02T 10/144* (2013.01); *Y02T 10/146* (2013.01)

(58) Field of Classification Search
   USPC ........................................................ 415/58.4
   See application file for complete search history.

(56) References Cited

U.S. PATENT DOCUMENTS

| | | | | |
|---|---|---|---|---|
| 4,990,053 | A * | 2/1991 | Rohne | F04D 27/0215 |
| | | | | 415/143 |
| 5,246,335 | A * | 9/1993 | Mitsubori | F04D 29/4213 |
| | | | | 415/214.1 |
| 6,447,241 | B2 * | 9/2002 | Nakao | F04D 29/4213 |
| | | | | 415/1 |
| 7,775,759 | B2 * | 8/2010 | Sirakov | F04D 29/4213 |
| | | | | 415/1 |
| 8,272,832 | B2 * | 9/2012 | Yin | F04D 29/444 |
| | | | | 415/191 |
| 8,465,251 | B2 * | 6/2013 | Hosoya | F04D 27/0207 |
| | | | | 415/119 |
| 2004/0009061 | A1 | 1/2004 | McDonald | |
| 2005/0002782 | A1 | 1/2005 | Nikpour et al. | |
| 2009/0214334 | A1 * | 8/2009 | Fukami | F04D 29/4213 |
| | | | | 415/206 |
| 2012/0121400 | A1 | 5/2012 | Tomita et al. | |

FOREIGN PATENT DOCUMENTS

| | | |
|---|---|---|
| EP | 1473463 A1 | 11/2004 |
| EP | 2 194 279 A1 | 6/2010 |
| EP | 2434185 A1 | 3/2012 |
| JP | 2004-44576 A | 2/2004 |
| JP | 2004-332733 A | 11/2004 |
| JP | 2006-2650 A | 1/2006 |
| JP | 2010-270641 A | 12/2010 |
| JP | 2011-85095 A | 4/2011 |
| JP | 2012-149619 A | 8/2012 |

OTHER PUBLICATIONS

Extended European Search Report for European Application No. 12883163.3, dated Jul. 24, 2015.
Chinese Office Action dated Apr. 12, 2017, issued to the corresponding CN Application No. 201280074538.6.
International Preliminary Report on Patentability and Written Opinion of the International Searching Authority (forms PCT/IB/373, PCT/ISA/237, PCT/IB/326 and PCT/IB/338), dated Mar. 5, 2015, for International Application No. PCT/JP2012/071396, along with a translation of the Written Opinion.
International Search Report and Written Opinion of the International Searching Authority (forms PCT/ISA/210, PCT/ISA/237, and PCT/ISA/220), dated Nov. 6, 2012, for International Application No. PCT/JP2012/071396.
Japanese Notice of Allowance, dated Oct. 17, 2014, for Japanese Application No. 2014-501360, along with English Translation.

* cited by examiner

Related Art

FIG.11

CENTRIFUGAL COMPRESSOR

TECHNICAL FIELD

The present invention relates to a centrifugal compressor including an impeller wheel which is rotated by a rotational shaft.

BACKGROUND

In the field of engines used in vehicles, for instance, a widely-known exhaust turbocharger rotates a turbine by energy of exhaust gas of an engine, then compresses intake air by a centrifugal compressor directly connected to the turbine via a rotational shaft, and supplies the compressed air to the engine in order to improve the output of the engine.

Figure 11:
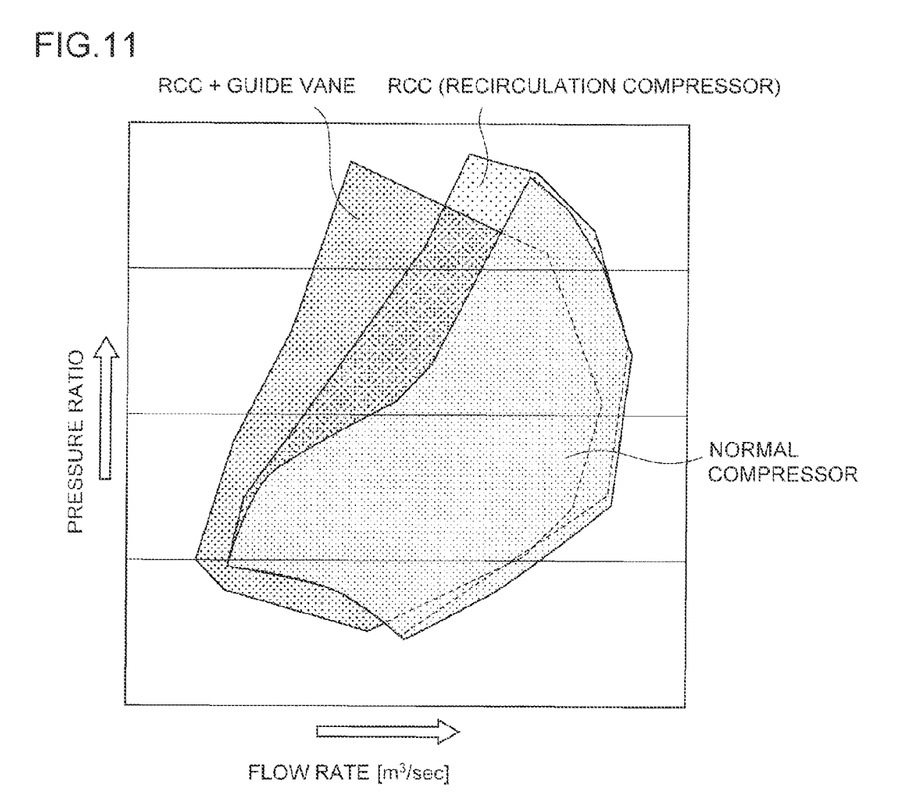
FIG. 11 is a comparison graph of common performance characteristics of centrifugal compressors.

As represented by the normal compressor of the performance-characteristic comparison chart in FIG. 11 where y-axis is the pressure ratio and x-axis is the flow rate, a compressor of such an exhaust turbocharger is stably operated in the flow-rate range from a surge flow rate (left-hand line in the drawing) at which surging, or pulsation of the entire system, occurs, to a choke flow rate (right-hand line in the drawing) at which choking occurs and the flow rate stops increasing.

However, in a centrifugal compressor of the normal compressor type in which intake air is directly introduced into an impeller wheel, the flow-rate range between the choke flow rate and the surge flow rate where stable operation is possible is narrow. Thus, there is a problem in that it is necessary to operate the compressor at an inefficient operation point which is differed from the surge flow rate, in order to avoid surging.

In order to solve the above problem, Patent Document 1 discloses a technique of increasing the operation range of an exhaust turbocharger by providing guide vanes at the upstream side of an impeller wheel of the centrifugal compressor to swirl intake air at the upstream side of the impeller wheel, and a technique of providing a recirculation flow path for a housing of a supercharger to recirculate a part of intake gas introduced into the impeller wheel.

Such techniques will be described briefly in reference to FIG. 10.

An impeller wheel 101 of a centrifugal compressor 100 includes a plurality of vanes 104 which are rotatable in a housing 102, and the housing 102 includes an inner wall disposed in the vicinity of radially outer edges 104a of the vanes 104.

An intake-gas inlet of the centrifugal compressor 100 includes an outer annular wall 107 forming a gas inlet 108, and an inner annular wall 109 extending inside the outer annular wall 107 to form an inducer part 110. An annular gas flow channel 111 is formed between the annular walls 109, 107.

A housing surface 105 by which the vanes 104 pass through is in communication with the annular flow channel 111 via a downstream opening part 113.

An upstream opening part brings the annular flow channel 111 into communication with the inducer part 110 being the inlet intake part. Inlet guide vanes 114 are provided inside the inducer part 110 downstream with respect to the upstream opening part to induce precedent swirls in the gas flow passing through the inducer part 110. When the flow rate of the air passing through the compressor is small due to the above configuration, the direction of the air flow passing through the annular flow channel 111 is reversed, and the air flows from the impeller wheel through a downstream opening part 113 and the annular flow channel 111 extending in the upstream direction to be introduced again into the gas inlet 108, so as to recirculate in the compressor.

As a result, performance of the compressor is stabled, and the compressor surge margin and the choke flow are both improved (see "RCC (recirculation compressor)" of FIG. 11).

Further, Patent Document 1 discloses that the inner annular wall 109 and the outer annular wall 107 extend in the upstream direction and house an inlet guide-vane apparatus. The inlet guide-vane apparatus includes a plurality of the guide vanes 114 extending between a center nose cone 115 and the inner annular wall 109.

The guide vanes 114 sweep forward in the rotational direction of the impeller wheel 101 to induce precedent swirls in the air flow which reaches the impeller wheel 101. The precedent swirls improve the surge margin (surge limit) of the compressor. In other words, the precedent swirl flow reduces the flow which causes surging in the compressor. (see the "RCC with guide vanes" of FIG. 11).

CITATION LIST

Patent Literature

Patent Document 1: Japanese Unexamined Patent Application Publication No. 2004-332733 (see Abstract and FIG. 1)

SUMMARY

Technical Problem

Figure 10:
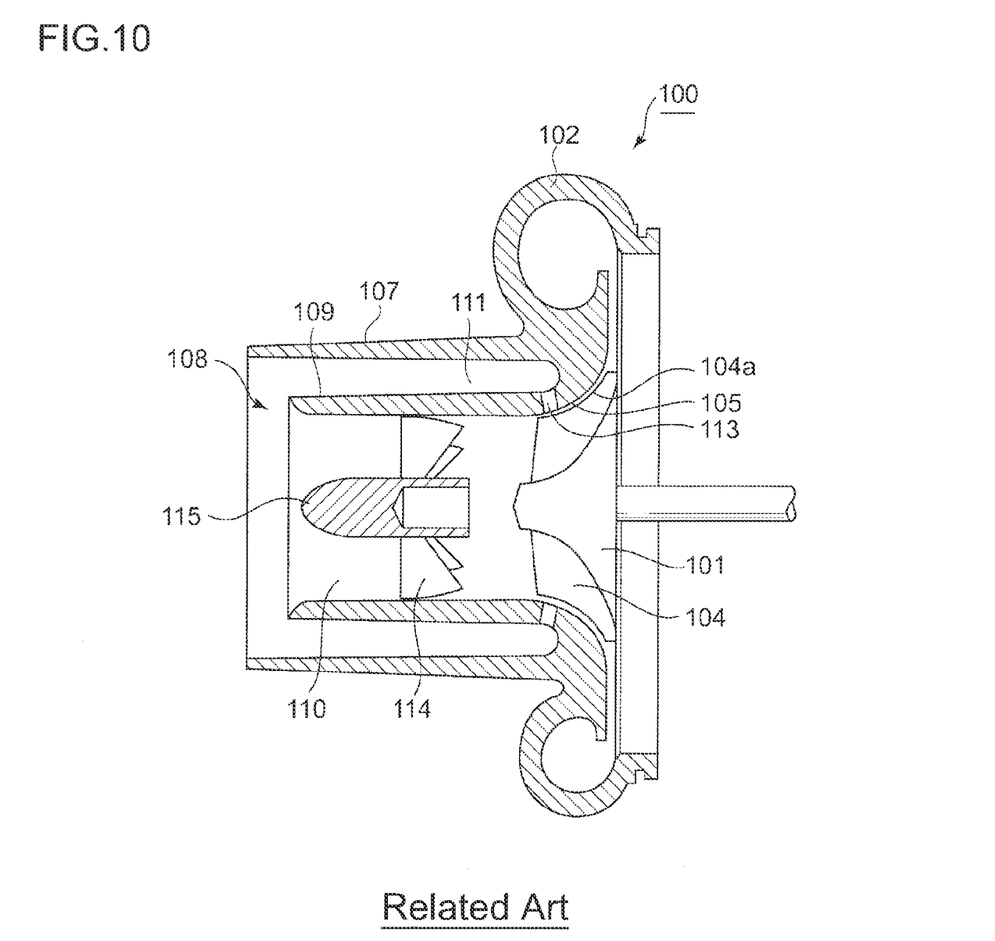
FIG. 10 is a cross-sectional illustrative diagram of a conventional centrifugal compressor.

In the conventional art illustrated in FIG. 10, however, the fact that the center nose cone 115 is positioned in the central space of the inner annular wall in front of the impeller wheel definitely increases intake-air resistance and reduces the choke flow with respect to the intake flow at the center nose cone 115, though not illustrated in FIG. 11. Also, it is difficult to manufacture the center nose cone 115 and to attach the center nose cone on the center axis of the guide vanes.

That is, the conventional guide vanes for generating the swirl flow have a problem in that a member having a cone shape for directing intake-air to the guide vanes is disposed in the central part of the guide vanes, which increases the air resistance and reduces the choke flow rate.

Further, in Patent Document 1, the annular gas flow channel 111 having a form of a slit-like annular gap whose far end is open is disposed between the outer annular wall 107 and the inner annular wall 109. Thus, in other words, the far end of the outer annular wall 107 and the far end of the inner annular wall 109 have an open structure, which tends to make noise inevitably and thus requires a cover for preventing the noise generation.

That is, the conventional recirculation flow path has a problem in that noise generated by rotation of an impeller wheel resonates in the recirculation flow path, which leads to increase in the noise.

Further, extending the inner annular wall to the upstream side to elongate the recirculation flow path disturbs the circulation flow of the air entering the guide vanes due to the interference with the inlet intake air.

In view of the above technical problems, an object of the present invention is to make it possible to provide guide vanes directly on the housing inner circumferential side in front of the impeller wheel without providing a center nose cone so that it possible to improve the surge margin without reducing the choke flow, unlike the conventional techniques.

In other words, an object of the present invention is to reduce air resistance of guide vanes for generating a swirl flow to restrict the decrease in the choke flow rate and to improve the surge margin to increase the operation range of a compressor, and further, to restrict resonance of noise generated by rotation of an impeller wheel in a recirculation flow path.

Specifically, an object of the present invention is to provide an invention which forms a recirculation flow path with an outer annular wall 107 and an inner annular wall 109 having far ends not opened but closed, and in consequence restricts noise caused by the open structure of the far ends of the outer annular wall 107 and the inner annular wall 109 so that, preferably, a cover for preventing noise generation is dispensed with.

Further, another object of the present invention is to provide an invention capable of variably elongating the length of a recirculation flow path.

Still further, another object is to provide an invention which does not include an annular gas flow channel 111 of a slit-like annular gap with opened far ends, so that there is substantially no inner circulation wall 109, and thus the circulation flow of air entering guide vanes is not disturbed by interference with the inlet intake air.

Solution to Problems

In order to solve the above problems, a centrifugal compressor is proposed, which includes: a housing including an intake-air inlet which opens in a direction of a rotational axis of the centrifugal compressor, and an intake-air channel which connects to the intake-air inlet; an impeller wheel disposed inside the housing rotatably around the rotational axis, and configured to compress intake gas which flows in from the intake-air inlet; and a swirl-flow generating unit disposed between the intake-air inlet and the impeller wheel inside the housing and configured to swirl the intake gas which flows in from the intake-air inlet.

The swirl-flow generating unit includes a swirl-flow generating part which includes a plurality of guide vanes disposed in a circumferential direction along an inner circumferential wall of the housing and which is configured to swirl the intake gas flowing in from the intake-air inlet around the rotational axis by means of the plurality of guide vanes, and a central intake-air flow part which is a space surrounded by the swirl-flow generating part and which opens in the direction of the rotational axis so that the intake gas flowing in from the intake-air inlet passes through the central intake-air flow part.

According to the present invention, the intake gas flowing in from the intake-air inlet is swirled to reduce the surge flow rate (minimum flow rate), thereby improving the surge margin. Also, the central intake-air flow part is a space, which reduces the resistance of the intake-air gas flow, and in consequence, restricts decrease in the choke flow rate (maximum flow rate).

Thus, according to the present invention, it is possible to dispense with a central nose cone to provide an open space without air resistance at a front center part of the impeller wheel, and to position the guide vanes directly on the inner circumferential side of the housing in front of the impeller wheel via the open space, which makes it possible to improve the surge margin without reducing the choke flow rate unlike the conventional technique, thereby increasing the operation range of the centrifugal compressor.

Further, preferably, the central intake-air flow part may be formed by a ring circular member which is disposed concentric with the rotational axis and which has a hollow center, and the guide vanes may be arranged in a circumferential direction on an outer circumferential side of the ring circular member.

Accordingly, the central intake-air flow part with no air resistance at the front center part of the impeller part is disposed at the center of the guide vanes without providing a center nose cone, so that it is possible to introduce intake air directly to the impeller wheel via the central intake-air flow part. Also, the ring circular member separates the flow of the intake-air gas passing through the guide vanes at the outer circumferential side of the ring circular member from the flow of the intake gas flowing through the central intake-air flow part at the center, thereby increasing the flow rate of the intake gas passing through the guide vanes to enhance the swirl flow and further improving the surge margin.

Also, the guide vanes are supported at both sides between the ring circular member and the inner circumference of the housing, so that the guide vanes disposed in the circumferential direction is rigidly supported without a center nose cone.

Further, preferably, the housing includes a recirculation flow path which is disposed on an outer side of the intake-air channel and which brings an outer circumferential section of the impeller wheel into communication with the intake-air channel at an upstream side with respect to the impeller wheel.

Accordingly, providing the recirculation flow path makes it possible to improve the surge margin by use of the recirculation flow path in addition to the improvement of the surge margin by use of the above described swirl-flow generating unit.

Further, preferably, an opening end portion at an upstream side of the recirculation flow path is disposed upstream with respect to the swirl-flow generating unit.

Accordingly, the opening end portion at the upstream side of the recirculation flow path is disposed upstream with respect to the swirl-flow generating unit, so that it is possible to effectively combine the improvement of the surge margin by use of the recirculation flow path and the improvement of the surge margin by use of the swirl-flow generating unit. This is because it is possible to swirl the entire intake-air having been recirculated by the recirculation flow path by causing the intake-air to flow through the guide vanes of the swirl-flow generating unit.

Further, preferably, the housing is divided in half into an upstream housing and a downstream housing at a position where the recirculation flow path is divided.

Accordingly, the recirculation flow path of the housing is divided at a halfway position into two sections in the axial direction, which makes it possible to vary the length of the recirculation flow path arbitrarily. As a result, it is possible to vary the length of the recirculation flow path to circulate a part of the intake gas introduced into the impeller wheel so that it is possible to adjust the surge flow rate, thereby further improving the surge margin in addition to the improvement of the surge margin by use of the swirl-flow generating unit.

Furthermore, making the length of the recirculation flow path variable makes it possible to set the resonance range of resonance caused by the recirculation flow path within a range where it is possible to avoid the frequency of noise generated by the impeller wheel.

Also, it is possible to process the voids of the recirculation flow path from the divided surfaces of the housing, which facilitates formation of the recirculation flow path.

Further, preferably in the present invention, the recirculation flow path formed in the upstream housing has a far end portion extending toward the intake-air inlet, the far end portion communicating with an inner circumferential wall of the intake-air channel at a halfway position of the upstream housing without opening toward the intake-air inlet to form an annular slit-like void, so that a far end section of the upstream housing is formed as a single annular inlet part.

Accordingly, the far end section of the recirculation flow path which is formed in the upstream housing and which faces the intake-air inlet is not open toward the intake-air inlet, unlike a slit-like annular gap, but communicates with the intake-air flow channel side at a halfway position of the upstream housing, so that the far end section of the upstream housing is formed as a single inlet annular part. Thus, unlike the convention art (FIG. 10), the annular gas flow channel 111 forming the recirculation flow path is not formed by the far end sections of the outer annular wall 107 and the inner annular wall 109 to have an open structure but the annular gas flow channel 111 has a closed structure, which prevents noise generation caused by resonance or the like and makes it unnecessary to provide a cover for preventing noise generation or the like.

Further, preferably in the present invention, the housing includes a recirculation flow path which is disposed at an outer side of the intake-air channel and which brings an outer circumferential section of the impeller wheel into communication with the intake-air channel at an upstream side with respect to the impeller wheel. Also, the recirculation flow path has a far end portion extending toward the intake-air inlet, the far end portion communicating with an inner circumferential wall of the intake-air channel without opening toward the intake-air inlet to form an annular slit-like void, so that a far end section of the housing is formed as a single annular inlet part.

Accordingly, the far end portion of the recirculation flow path extending toward the intake-air inlet communicates with the inner circumferential wall of the intake-air channel without opening toward the intake-air inlet to form an annular slit-like void so that the far end section of the housing is formed as a single annular inlet even in a case where the housing does not have a structure divided into the upstream housing and the downstream housing as described above. As a result, noise generation due to resonance or the like caused in the recirculation flow path is prevented.

Further, preferably in the present invention, each of the upstream housing and the downstream housing which are divided halves of the housing includes a plurality of circulation voids constituting the recirculation flow path along a circumference around the rotational axis.

Accordingly, the recirculation flow path includes a plurality of circulation voids so that it is possible to set the number and lengths of the plurality of voids so as to reduce noise generation in the recirculation flow path.

Further, preferably in the present invention, the upstream housing which is a half of the divided housing includes a cylindrical slit-like void centered at the rotational axis constituting the recirculation flow path, and the downstream housing includes a plurality of circulation voids constituting the recirculation flow path along a circumference around the rotational axis.

Accordingly, providing a plurality of circulation voids as the plurality of recirculation flow paths at the downstream side makes it possible to reduce noise generation in the recirculation flow path. Further, it is easy to process the circulation flow void at the upstream side because the circulation flow void at the upstream side has an annular shape having slit-like void.

Further, preferably in the present invention, the swirl-flow generating unit includes an outer cylindrical member to be fitted to an inner circumferential wall of the housing and the guide vanes arranged in a circumferential direction along the inner circumferential wall of the outer cylindrical member, the swirl-flow generating unit being formed as a separate body from the housing. Also, the outer cylindrical member is fitted to the housing.

Accordingly, it is possible to mount the swirl-flow generating unit to the centrifugal compressor by press fitting or the like, which facilitates the manufacturing process. Further, it is possible to easily vary the operating range by mounting a swirl-flow generating unit having guide vanes of different heights and angles.

Further, preferably in the present invention, the swirl-flow generating unit includes an outer cylindrical member to be fitted to an inner circumferential wall of the housing and the guide vanes arranged in a circumferential direction along the inner circumferential wall of the outer cylindrical member, the swirl-flow generating unit being formed as a separate body from the housing. Also, the outer cylindrical member is fitted to the housing so that an outer circumferential wall of the outer cylindrical member forms an inner circumferential section of the recirculation flow path.

Accordingly, it is possible to mount the swirl-flow generating unit to the centrifugal compressor by press fitting or the like, which facilitates the manufacturing process. Further, it is possible not only to easily vary the operating range by mounting a swirl-flow generating unit having guide vanes of different heights and angles, but also to reduce the thickness of the housing by forming the outer cylindrical part of the swirl-flow generating unit as the inner circumferential part of the recirculation flow path. Also, it is easy to process the voids.

Further, preferably in the present invention, the swirl-flow generating unit includes an outer cylindrical member to be fitted to an inner circumferential wall of the housing and the guide vanes arranged in a circumferential direction along the inner circumferential wall of the outer cylindrical member. Also, an inner diameter of an inner circumferential wall of the outer cylindrical member is larger than an inner diameter of the intake-air channel at a leading edge part of the impeller wheel.

Still further, the inner diameter of the inner circumferential wall of the outer cylindrical member is set so as to increase an area of a flow path corresponding to at least an area of the flow path which is reduced by the plurality of guide vanes blocking the flow path.

Accordingly, it is possible to increase the flow path area which has been reduced by the guide vanes of the swirl-flow generating unit, so that it possible to improve efficiency by recovering the pressure and to restrict the decrease in the choke flow rate (maximum flow rate), thereby further increasing the operation range.

Advantageous Effects

According to the present invention, it is possible to position guide vanes directly on the inner circumferential side of a housing in front of an impeller wheel without a center nose cone, so that it possible to improve the surge margin without reducing the choke flow unlike the conventional art. As a result, it is possible to increase the operation range of a compressor.

Further, the housing is divided in half into an upstream housing and a downstream housing, and the far end section of the upstream housing extending toward the intake-air inlet is not open to form an annular slit-like void, but is formed into a ring circular shape. Thus, unlike the conventional art (FIG. 10), the annular gas flow channel 111 forming the recirculation flow path is not formed by the outer annular wall 107 and the far end portion does not have an open structure. Thus, noise generation due to resonance or the like is prevented and it is no longer necessary to provide a cover for preventing noise generation or the like.

Further, according to the present invention, it is possible to vary the length of the recirculation flow path arbitrarily because the recirculation flow path of the housing is divided in half at the halfway position thereof.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
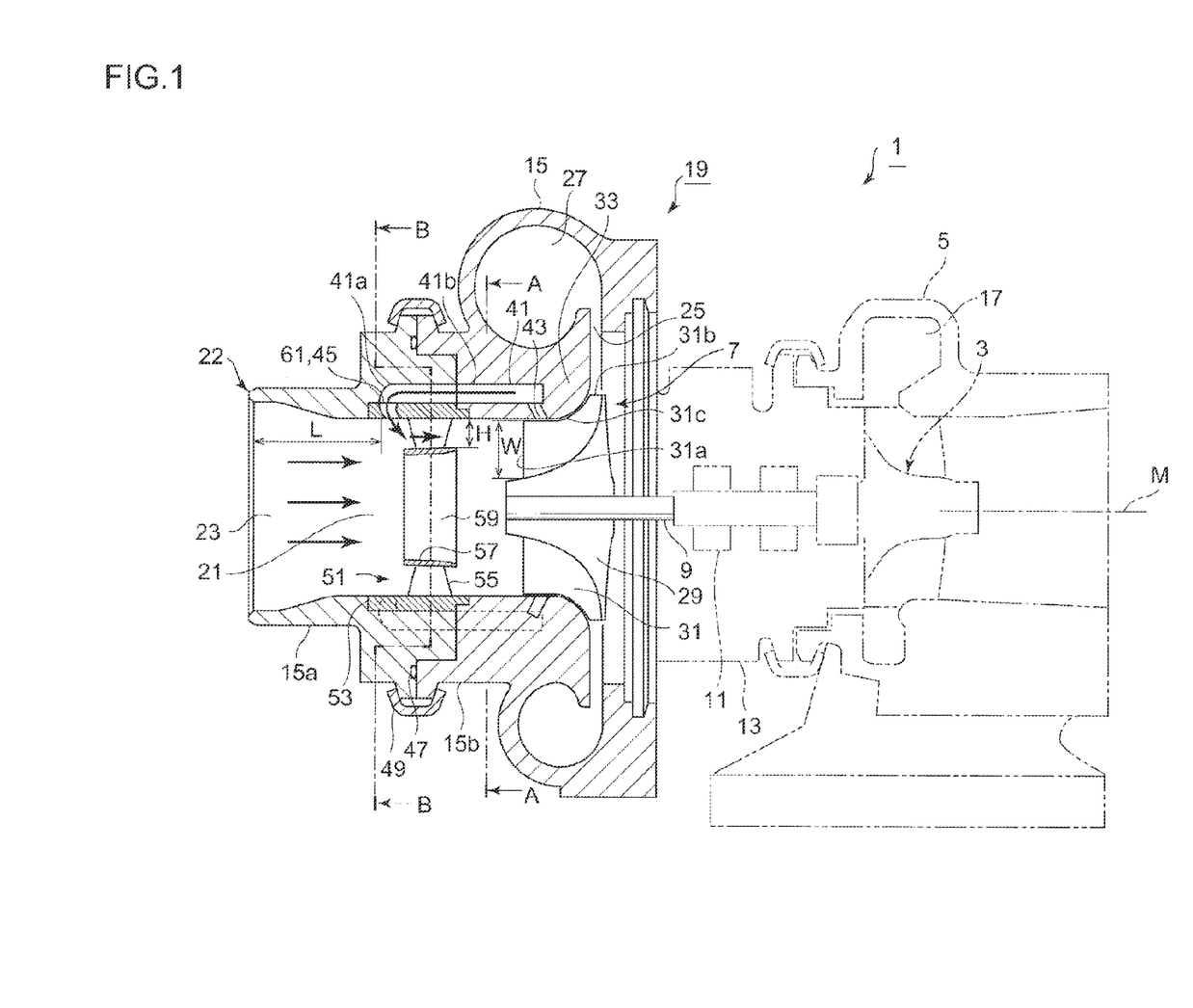
FIG. 1 is a partial cross-sectional view of a centrifugal compressor in the direction of a rotational axis according to the first embodiment of the present invention.

FIG. 1 is a partial cross-sectional view of an exhaust turbocharger 1 of an internal combustion engine in the direction of the rotational axis. The exhaust turbocharger 1 includes a turbine housing 5, a bearing housing 13, and a compressor housing 15 coupled together. The turbine housing 5 accommodates a turbine rotor 3 which is driven by exhaust gas of the internal combustion engine. The bearing housing 13 supports a rotational shaft 9 which transmits a rotational force of the turbine rotor 3 to an impeller wheel 7 to be freely rotatable via a bearing 11. The compressor housing 15 accommodates the impeller wheel 7 which draws in and compresses air as intake gas.

A scroll channel 17 of a spiral shape is formed on the outer circumferential part of the turbine housing 5 so as to surround the outer circumference of the turbine rotor 3, so that exhaust gas from the internal combustion engine flows toward the axial center from the outer circumferential side and exits in the axial direction to rotate the turbine rotor 3.

The compressor (centrifugal compressor) 19 according to the present invention includes the impeller wheel 7 which is supported inside the compressor housing 15 to be rotatable around the rotational axis line M of the rotational shaft 9. An intake-air channel 21 which introduces intake gas not having been compressed, the air for instance, to the impeller wheel 7 extends in the direction of the rotational axis line M and coaxially so as to form a cylindrical shape. Also, an intake-air inlet 23 opens at the end of the intake-air channel 21 to connect to the intake-air channel 21. The intake-air inlet 23 has a diameter increasing toward the end to have a tapered shape so as to facilitate introduction of the air.

A diffuser 25 is formed on the outer side of the impeller wheel 7, extending in a direction perpendicular to the rotational axis line M. An air channel 27 of a spiral shape is disposed on the outer circumference of the diffuser 25. The air channel 27 of a spiral shape forms the outer circumferential part of the compressor housing 15.

Also, the impeller wheel 7 includes a hub section 29 which is driven to rotate around the rotational axis line M and a plurality of vanes 31 which are driven to rotate with the hub 29 section. The hub section 29 is mounted to the rotational shaft 9, and the plurality of vanes 31 are attached to the radially outer face of the hub section 29.

The vanes 31 are driven to rotate and compress the air drawn in from the intake-air inlet 23 through the intake-air channel 21. The shape of each vane 31 is not particularly limited. Each vane 31 includes a leading edge 31a which is an edge portion on the upstream side, a trailing edge 31b which is an edge portion on the downstream side, and an outer circumferential edge (outer circumferential portion) 31c which is an edge portion on the radially outer side. The outer circumferential edge 31c is a lateral edge portion covered by a shroud section 33 of the compressor housing 15. Also, the outer circumferential edges 31c are arranged so as to pass by the vicinity of the inner surface of the shroud section 33.

The impeller wheel 7 of the compressor 19 is driven to rotate around the rotational axis line M by the rotational driving force of the turbine rotor 3. Then, the outside air is drawn in from the intake-air inlet 23 to flow through the vanes 31 of the impeller wheel 7, so that the dynamic pressure is mainly increased. Subsequently, the air flows into the diffuser 25 disposed on the radially outer side, has a part of the dynamic pressure converted into static pressure so that the pressure is increased, and then exits through the air channel 27 of a spiral shape. Then, the air is supplied to the internal combustion engine as intake air.

(Recirculation Flow Path)

Next, a recirculation flow path 41 formed in the compressor housing 15 will be described.

The recirculation flow path 41 is disposed so as to bring a downstream opening end portion 43 of an annular shape into communication with an upstream opening end portion 45. The downstream opening end portion 43 opens at a part of the compressor housing 15 facing the outer circumferential edges 31c of the vanes 31. The upstream opening end portion 45 opens at the inner circumferential wall of the compressor housing 15 at the upstream side with respect to the leading edges 31a of the vanes 31. Further, a part of the air immediately after having flowed into gaps between the vanes 31 or a part of the air being pressurized is recirculated into the intake-air channel 21 at the upstream side of the impeller wheel 7 through the recirculation flow path 41.

Further, the recirculation flow path 41 includes a plurality of circulation voids 41a, 41b disposed on the circumference around the rotational axis line M at the outer side of the intake-air channel 21 of a cylindrical shape.

Further, the compressor housing 15 is divided into an upstream half and a downstream half at a position in middle of the circulation flow path 41, so as to include an upstream housing 15a and a downstream housing 15b.

The abutting surfaces between the upstream housing 15a and the downstream housing 15b are each formed to have a stair-like shape, so that positions are determined in the direction of the rotational axis line M and in the radial direction orthogonal to the rotational axis line M by spigot-and-socket fitting. Also, the upstream housing 15a and the downstream housing 15b are coupled to each other by a clamp ring 49 with a seal ring 47 interposed therein. Here, bolts or the like may be used for the coupling.

Further, in the upstream housing 15a and the downstream housing 15b obtained by dividing the compressor housing 15 into two sections, a plurality of the circulation voids 41a, 41b are formed to extend in the direction of the rotational axis line M, constituting the circulation flow path 41 on the circumference around the rotational axis line M.

The recirculation flow path 41 formed in the upstream housing 15a does not extend to reach the far end of the upstream housing 15a but is terminated halfway to connect to the upstream opening end portion 45 which communicates with the intake-air channel 21 at the inner circumferential face of the upstream housing 15a.

As a result, the far end portion of the upstream housing 15a does not have an open structure (an open structure which is open toward an intake-air inlet as in the conventional art illustrated in FIG. 10, or a double-ring structure) at a part facing the intake-air inlet 23. Instead, the part facing the intake-air inlet 23 is formed as a single inlet annular part (a ring-like part forming the intake-air inlet 23 of FIG. 1) 22.

Additionally, it is possible to have the length L (see FIG. 1) between the intake-air inlet 23 formed on the inner circumferential side of the inlet annular part 22 and the upstream opening end portion 45 of the recirculation flow path 41. Thus, noise from the recirculation flow path 41 is unlikely to be emitted to the outside through the intake-air inlet 23, which is effective in addressing noise generation.

Accordingly, emission of noise due to resonance is restricted and it is unnecessary to provide a cover for preventing noise generation.

Figure 2:
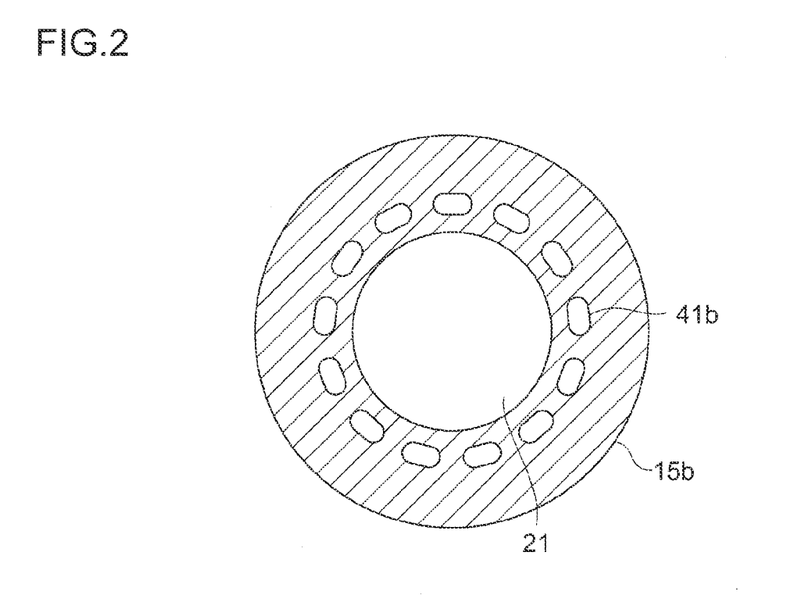
FIG. 2 is a partial cross-sectional view of FIG. 1 taken along line A-A.

FIG. 2 illustrates an arrangement of the circulation voids 41b in the downstream housing 15b in a cross-sectional view taken along a direction perpendicular to the rotational axis line M (along line A-A). In the present embodiment, a plurality of, for example, thirteen, circulation voids 41b of a substantially ellipse shape are arranged at equal intervals on the same circumference at the outer side of the intake-air channel 21, so that the longitudinal directions of the ellipse shapes are along the circumferential direction.

Figure 3:
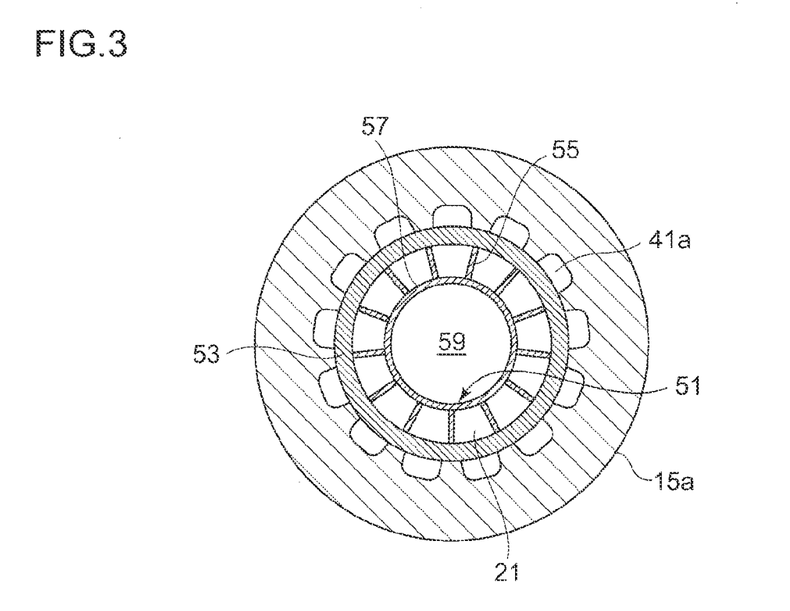
FIG. 3 is a partial cross-sectional view of FIG. 1 taken along line B-B.

FIG. 3 illustrates an arrangement of the circulation voids 41a in the upstream housing 15a in a cross-sectional view taken along a direction perpendicular to the rotational axis line M. Thirteen circulation voids 41b of the substantially same ellipse shape are arranged at the outer side of the intake-air channel 21 with equal intervals in the circumferential direction on the same circumference as the circumference on which the above described circulation voids 41b formed in the downstream housing 15b are arranged.

The same number of projection-and-recess parts as the number of the circulation voids 41a are formed on the inner circumferential wall of the upstream housing 15a in the circumferential direction. An outer cylindrical member 53 of the swirl-flow generating unit 51, which will be described below, is fitted to the inner circumferential surface of the projection-and-recess parts. The circulation voids 41a are surrounded and defined by the outer circumferential surface of the outer cylindrical member 53 and the recesses from among the projection-and-recess parts.

As described above, the recirculation flow path 41 is divided in half into a part being the upstream housing 15a and a part being the downstream housing 15b. Thus, it is possible to machine the circulation voids 41a, 41b of the recirculation flow path 41 from the divided surfaces of the upstream housing 15a and the downstream housing 15b, respectively. As a result, formation of the recirculation flow path 41 is facilitated. Adjustment of the lengths and the number of voids to be arranged in the circumference are also facilitated.

Further, the positions of the circulation voids 41b in the downstream housing 15b and the positions of the circulation voids 41a in the upstream housing 15a are formed to be identical in the radial direction and in the circumferential direction, so that the circulation voids 41a, 41b are integrated by coupling the housings.

The recirculation flow path 41, when being provided, functions as follows.

In a flow-rate state where the amount of air flowing through the compressor 19 is appropriate, the air flowing through the recirculation flow path 41 first flows from the intake-air inlet 23, and then flows through the upstream opening end portion 45 toward the downstream opening end portion 43, subsequently entering the circumferential edges 31c of the vanes 31 from the downstream opening end portion 43.

On the other hand, when the amount of the air passing through the compressor 19 decreases to such a low flow rate that causes surging, the air passing through the recirculation flow path 41 flows in the reverse direction from the downstream opening end portion 43 toward the upstream opening end portion 45 to be introduced again into the intake-air channel 21 and then to the impeller wheel 7. As a result, the amount of the air flowing into the leading edges 31a of the vanes 31 apparently increases, which makes it possible to reduce the surge flow rate which causes surging.

Providing the recirculation flow path 41 as described above makes it possible to reduce the surge flow rate. Here, the impeller wheel 7 generates noise of a certain frequency determined on the basis of the number of the vanes 31 and the rotation speed. Thus, the length of the recirculation flow path 41 and the number of the circulation voids 41a, 41b are set so that a frequency range is not resonant with the frequency of noise caused by the impeller wheel 7.

(Swirl-Flow Generating Unit)

Next, the swirl-flow generating unit 51 will be described.

Figure 5:
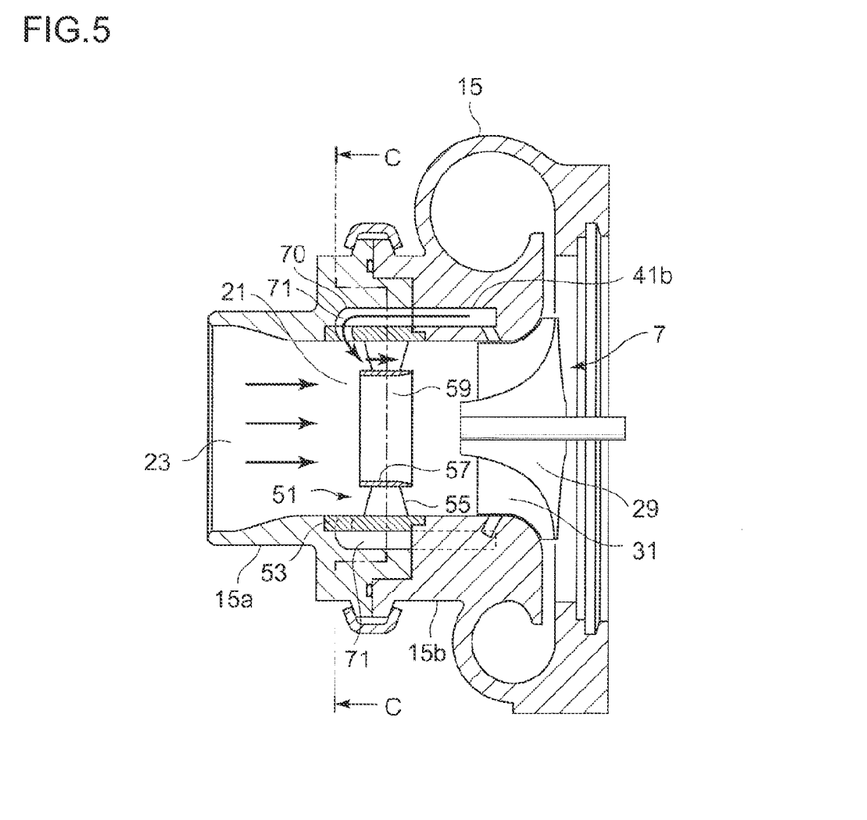
FIG. 5 is a partial cross-sectional view of the second embodiment, corresponding to FIG. 1.

As illustrated in FIG. 5, the swirl-flow generating unit 51 is disposed in the interior of the intake-air channel 21 of the upstream housing 15a and arranged between the intake-air inlet 23 and the impeller wheel 7 so as to swirl the air flowing in from the intake-air inlet 23.

Figure 4:
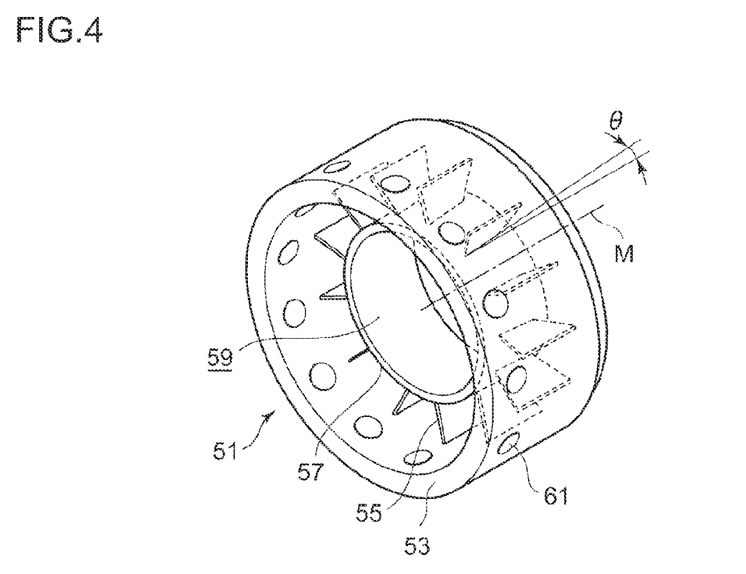
FIG. 4 is a perspective view of a swirl-flow generating unit.

The swirl-flow generating unit 51 includes the outer cylindrical member 53 to be fitted to the inner circumferential wall of the upstream housing 15a, a plurality of guide vanes 55 arranged at equal intervals in the circumferential direction along the inner circumferential wall of the outer cylindrical member 53, and an inner cylindrical member 57 disposed so as to connect the inner circumferential edge portions of the guide vanes 55. The guide vanes 55 make up a swirl-flow generating part, and a central intake-air flow channel 59 is formed inside the inner cylindrical member 57. The air flowing in from the intake-air inlet 23 flows through the inner cylindrical member 57 toward the impeller wheel 7 in the direction of the rotational axis line M.

The guide vanes 55 each include a plate member of a thin plate-like shape whose shape in the direction of the rotational axis line M is a substantially trapezoidal shape. Each plate member is fixed to the outer cylindrical member 53 at the long base of the trapezoidal shape and is fixed to the inner cylindrical member 57 at the short base of the trapezoidal shape.

The guide vanes 55 are attached so that the leading edges each have an inclination angle θ with respect to the rotational axis line M. By means of this inclination angle θ, the air having flowed in the direction of the rotational axis line M is swirled in the same direction as the rotational direction of the impeller wheel 7, thereby generating a swirl flow. Also, the guide vanes 55 are attached to the surfaces of the outer cylindrical member 53 and the inner cylindrical member 57 linearly or curvedly.

This swirl flow swirls and applies the intake-air flow flowing into the vanes 31. Thus, it is possible to lower the surge flow rate by the guide vanes 55 to increase the operation range, functioning in addition to the reduction of the surge flow rate achieved by the above described recirculation flow path 41.

The inclination angle θ is preferably greater than 20 degrees and not greater than 50 degrees (20°<θ≤50°), where the direction in the rotational axis line is 0 (zero) degree and the vane surface extending perpendicularly to the rotational axis line M is 90 degrees. This is because the target surge increase may not be achieved when the angle is less than 20 degrees, and the flow loss increases to considerably affect decrease in the pressure and decrease in the choking flow rate when the angle is greater than 50 degrees.

While the inner cylindrical member 57 connecting the inner circumference of the guide vanes 55 has a cylindrical shape, the cross-section of this cylindrical shape may not be of a flat plate-like shape but of a blade-like shape. Further, the central intake-air flow channel 59 has small flow resistance because the intake air directly reaches the impeller wheel 7, thereby achieving a great effect in restricting decrease in the choking flow rate (the maximum flow rate).

Furthermore, the outer circumferential edge portions of the guide vanes 55 may be firmly fixed to the outer cylindrical member 53 and the thickness, in the circumferential direction, of the guide vanes 55 may be thick at the outer circumferential side and thin at the inner circumferential side to increase the supporting strength of the guide vanes 55, so as to support the guide vanes 55 only at the outer circumferential side with a cantilever supporting structure, omitting the inner cylindrical member 57.

In this case, the weight can be further reduced and there is no longer the flow resistance due to the inner cylindrical member 57. Thus, the effect of restricting decrease in the choking flow rate (the maximum flow rate) is further enhanced.

The swirl-flow generating unit 51 is formed separately from the upstream housing 15a and is mounted to the inner circumferential wall of the upstream housing 15a, by fitting the outer cylindrical member 53 therein by press-fitting or the like.

As illustrated in FIG. 1, when being assembled, the inner circumferential wall of the outer cylindrical member 53 is flush with the inner circumferential walls of the intake-air channel 21 formed in the downstream housing 15b and of the intake-air channel 21 formed in the upstream housing 15a. As a result, a smooth intake-air channel 21 is formed.

Further, as illustrated in FIG. 1, when the swirl-flow generating unit 51 is mounted to the inner circumferential part of the upstream housing 15a, the outer circumferential wall of the outer cylindrical member 53 forms the inner circumferential part of the circulation voids 41a formed in the upstream housing 15a.

As illustrated in FIGS. 1 and 4, a plurality of, thirteen in the present invention, openings 61 are disposed on the upstream end side of the outer cylindrical member 53 which is also the upstream end side of the guide vanes 55. The openings 61 make up the upstream opening end portion 45. As illustrated in FIG. 1, the openings 61 are inclined or curved so that their cross sections are directed toward the downstream side. As a result, the return flow flowing out from the openings 61 being the upstream opening end portions 45 flows toward the guide vanes 55.

Furthermore, as illustrated in FIGS. 3 and 4, the positions, in the circumferential direction, of the upstream opening end portions 45 are arranged between the intervals of the guide vanes 55. That is, they are positioned so that the return-flow air flowing out from the upstream opening end portions 45 flows into gaps between the plurality of guide vanes 55 provided in the circumferential direction. As a result, the positions are provided so as to facilitate swirling.

As described above, it is configured such that the return flow passes through the guide vanes 55, so that even more swirl flows are applied to improve the surge margin.

Still further, the compressor 19 is manufactured by forming the upstream housing 15a, the downstream housing 15b, and the swirl-flow generating unit 51 as components separate from one another, and assembling these components. Thus, the manufacture is facilitated. Since the compressor 19 is manufactured by assembling these components, it is easier to change the cross sections or lengths of the circulation voids 41a, 41b forming the recirculation flow path 41 or to change the number, the height H, or the inclination angle θ of the guide vanes 55. Thus, it is possible to easily change the operation range of the compressor 19.

For instance, as illustrated in FIG. 1, when changing the height H of the guide vanes 55 to be equal to or smaller than the height W of the leading edges 31a corresponding to the height W of the leading edges 31a of the vanes 55, such a change can be easily achieved by replacing only the swirl-flow generating unit 51. Further, it is also possible to change not only the height H but also the number, pitch in the circumferential direction and inclination angle θ of the guide vanes 55 by replacing the swirl-flow generating unit 51 alone.

Further, the length in the direction of the rotational axis line M of the recirculation flow path 41, and the cross sections and number of the circulation voids 41a, 41b are required to be such that a frequency range is not resonant with the frequency of noise caused by the impeller wheel 7. Here, the length of the recirculation flow path 41 can be changed by changing the length of the circulation void 41a in the upstream housing 15a and also providing the swirl-flow generating unit 51 having an outer cylindrical member 53 of the length corresponding to the length of the circulation void 41a.

As described above, the recirculation flow path 41 includes a plurality of circulation voids 41a, 41b and the voids are divided so that the length of each void is adjustable. As a result, it is possible to easily reduce noise generation in the recirculation flow path 41.

Further, the swirl-flow generating unit 51 is formed separately from the upstream housing 15a and mounted to the inner circumferential wall of the upstream housing 15a by fitting the outer cylindrical member 53 therein by press fitting or the like, and the intake-air channel 21 is also not exposed to the high-temperature atmosphere at the part where the air flows in. As a result, the swirl-flow generating unit 51 may be formed integratedly of a material other than iron, such as resin and light alloy including aluminum alloy, which is preferable in view of weight reduction and manufacture facilitation.

As described above, according to the present embodiment, swirling the intake air flowing in from the intake-air inlet 23 by means of the guide vanes 55 further reduces the surge flow rate (the minimum flow rate) and thus improves the surge margin, in addition to the improvement of the surge margin (surge generation limit) by the recirculation flow path 41.

Furthermore, the central intake-air flow channel 59 formed on the inner circumferential side of the guide vanes 55 reduces the flow resistance with respect to the intake air, which makes it possible to restrict the decrease in the choking flow rate (the maximum flow rate). As a result, it is possible to increase the operation range of the compressor 19. That is, it is possible to improve the supercharging performance of the exhaust turbocharger 1.

It is possible to increase the operation range considerably compared to a compressor only having a recirculation flow path, or to a compressor having a cone member in the center of the intake-air channel though having guide vanes as described in Patent Document 1.

Second Embodiment

Next, in reference to FIGS. 5 and 6, the second embodiment will be described.

The recirculation flow path 70 of the second embodiment is different from the first embodiment in that the recirculation flow path 70 includes a cylindrical slit-like void 71 instead of the plurality of circulation voids 41a formed in the upstream housing 15a. Other configurations are the same as those in the first embodiment.

Figure 6:
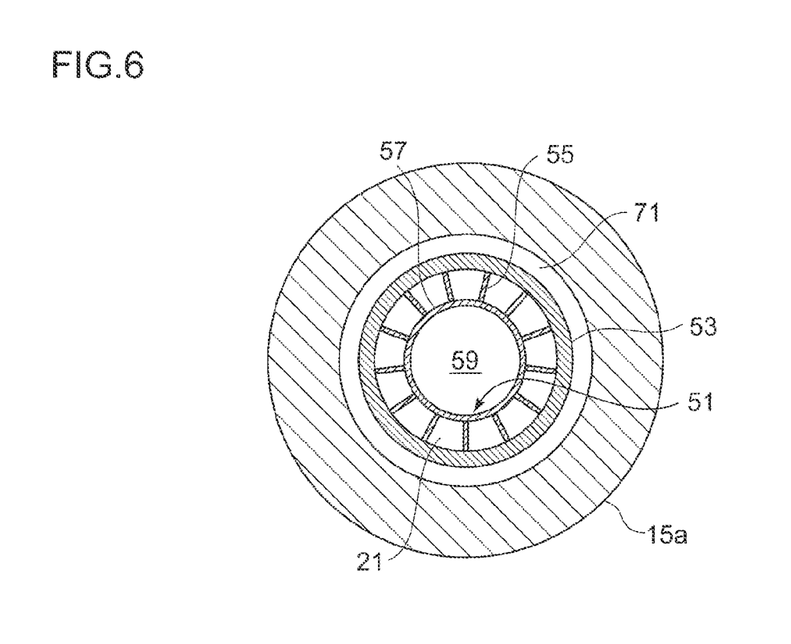
FIG. 6 is a partial cross-sectional view of FIG. 5 taken along line C-C.

As illustrated in FIGS. 5 and 6, a single slit-like void 71 is formed by fitting the outer cylindrical member 53 of the swirl generating unit 51 to the inner circumferential wall of the upstream housing 15a so as to maintain a gap, in the radial direction, that has the substantially same length as the length of the shorter diameter (see FIG. 2) of the ellipse shape of the circulation voids 41b formed in the downstream housing 15b. The slit-like void 71 is formed by the outer circumferential surface of the outer cylindrical member 53 and the inner circumferential wall of the upstream housing 15a.

According to the second embodiment, the recirculation flow path 70 includes the single slit-like void 71 of a cylindrical shape centered at the rotational axis line M instead of the circulation voids 41a formed in the upstream housing 15a in the first embodiment. Thus, the configuration of the circulation void formed in the upstream housing 15a or the recirculation flow path 70 is simplified.

As a result, the machining process is facilitated. That is, while the first embodiment may require the same number of projection-and-recess parts as the number of the circulation voids 41b in the downstream housing 15b to be formed in the circumferential direction on the inner circumferential wall of the upstream housing 15a, the second embodiment may not require formation of such projection-and-recesses parts but include a single cylindrical slit, so that the machining process is facilitated.

Further, the length and cross section of the recirculation flow path 41 can be changed to address noise generation only by changing the length of the downstream housing 15b, which involves only the circulation voids 41b formed in the downstream housing 15b.

Third Embodiment

Next, in reference to FIG. 7, the third embodiment will be described.

The third embodiment is different from the second embodiment in that the inner circumferential wall of the outer cylindrical member 53 of the swirl-flow generating unit 51 does not have a cylindrical shape but is curved in the direction of the rotational axis line M. Other configurations are the same as those in the second embodiment.

An outer cylindrical member 95 of a swirl-flow generating unit 93 is fitted to the inner circumferential wall of an upstream housing 91 so as to have a gap, in the radial direction, of the same length as the length of the shorter diameter (see FIG. 2) of the ellipse shapes of the plurality of circulation voids 41b formed in the downstream housing 15b.

Accordingly, a single slit-like void 97 of a substantially cylindrical shape is formed by the outer circumferential surface of the outer cylindrical member 95 and the inner circumferential wall of the upstream housing 91. A recirculation flow path 98 is formed by the plurality of circulation voids 41b and the single substantially-cylindrical slit-like void 97.

Figure 7:
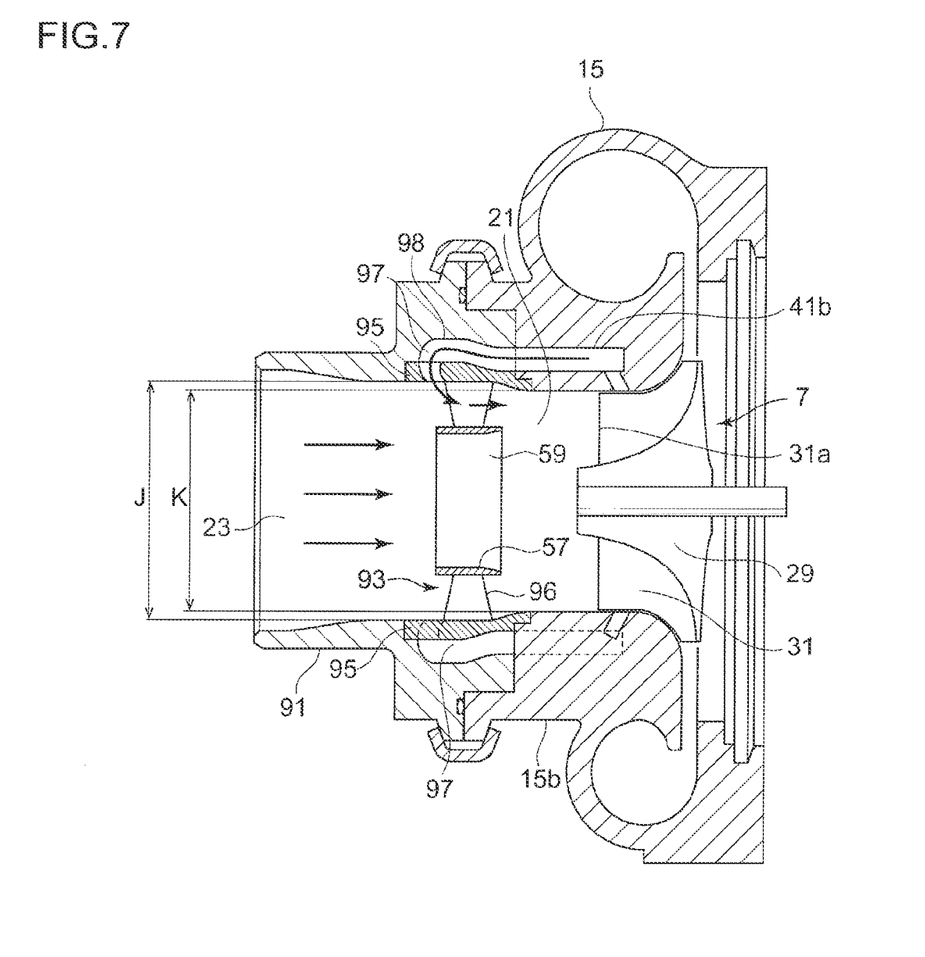
FIG. 7 is a partial cross-sectional view of the third embodiment, corresponding to FIG. 1.

As illustrated in FIG. 7, the inner diameter of the inner circumferential wall of the outer cylindrical member 95 varies from the small diameter K to the large diameter J, the small diameter K being identical to the inner diameter of the intake-air channel 21 at the leading edge 31a section of the vanes 31 of the impeller wheel 7.

The increasing change from the small diameter K to the large diameter J of the inner circumferential wall of the outer cylindrical member 95 is set so as to increase the flow-path area corresponding to the flow-path area which is reduced at least by the plurality of guide vanes 96 blocking the flow path, so that the flow-path area in the intake-air channel 21 does not decrease by providing the swirl-flow generating unit 93. The diameter may be further increased taking account of the decrease in the flow path area due to not only the guide vanes 96 but also the inner cylindrical member 57 connecting the inner circumferences of the guide vanes 96.

As described above, increasing the inner diameter of the inner circumferential wall of the outer cylindrical member 95 to be larger than the inner diameter of the intake-air channel 21 makes it possible to compensate the decrease in the flow path area in the intake-air channel 21 caused by providing the guide vanes 96 and the inner cylindrical member 57. Thus, it is possible to eliminate the influence of the flow resistance due to the swirl-flow generating unit 93 to improve the efficiency by recouping the pressure and to restrict the decrease in the choking flow rate (the maximum flow rate), which enables even further increase of the operation range.

Further, in the third embodiment, the recirculation flow path 98 includes a slit-like void 97 of a curved, substantially cylindrical shape instead of the single cylindrical slit-like void 71 in the second embodiment. However, the recirculation flow path 98 may be formed by a plurality of voids instead of the plurality of voids 41b in the first embodiment.

Fourth Embodiment

Next, in reference to FIG. 8, the fourth embodiment will be described.

The fourth embodiment is different from the first embodiment in that there is no recirculation path 41 provided. The other configurations are the same as those in the first embodiment.

Figure 8:
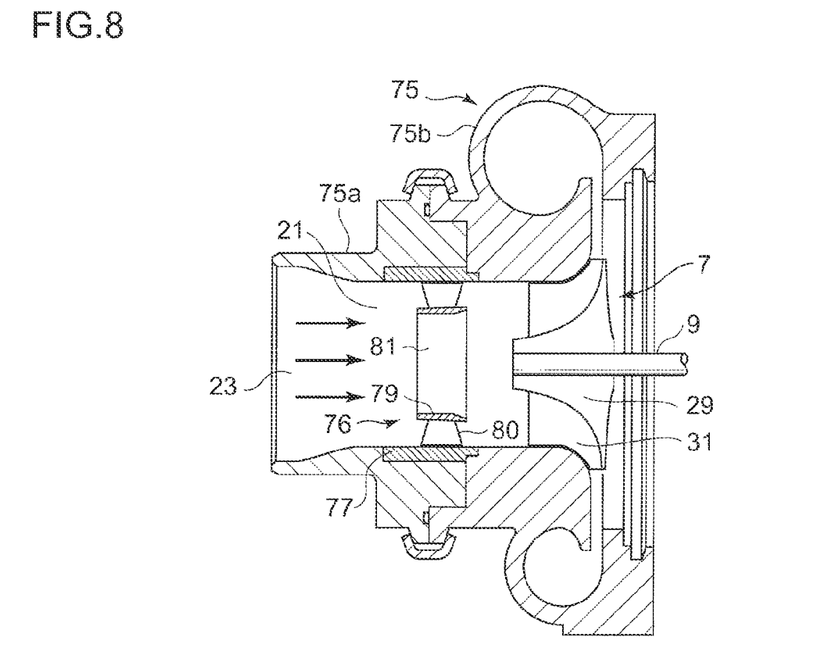
FIG. 8 is a partial cross-sectional view of the fourth embodiment, corresponding to FIG. 1.

As illustrated in FIG. 8, a compressor housing 75 is divided in half into an upstream housing 75a and a downstream housing 75b. An outer cylindrical member 77 of a swirl-flow generating unit 76 is fitted to the inner circumferential wall of the upstream housing 75a, and the downstream housing 75b is fitted to the combination of the upstream housing 75a and the outer cylindrical member 77 fitted together. Also, the swirl-flow generating unit 76 further includes an inner cylindrical member 79, guide vanes 80, and a central intake-air channel 81.

Further, the fitting surface of each component has a spigot-and-socket joint structure for determining positions in the direction of the rotational axis line M and in the radial direction, so that the positions of the components are determined.

Still further, with regard to the outer cylindrical member 77 of the swirl-flow generating unit 76, although the first embodiment includes a plurality of (thirteen) openings 61 disposed on the upstream end side of the outer cylindrical member 53 being the upstream side of the guide vanes 55 as illustrated in FIG. 4, the outer cylindrical member 77 of the swirl-flow generating unit 76 is formed to have a merely cylindrical shape in the present embodiment. The inner circumferential wall of the outer cylindrical member 77 is flush with the inner circumferential wall of the intake-air channel 21, thereby forming the inner circumferential wall of the intake-air channel 21.

According to the fourth embodiment, as illustrated in FIG. 8, there is no circulation void for forming the recirculation flow path 41 formed in the upstream housing 75a or the downstream housing 75b, unlike the first embodiment. Thus, the housing structure of the upstream side and the downstream side is simplified.

As a result, the machining of the upstream housing 75a and the downstream housing 75b is facilitated, and the assembling work is also facilitated because it is no longer necessary to match the positions of the circulation voids 41a, 41b in the circumferential direction.

Further, the upstream housing 75a, the swirl-flow generating unit 76, and the downstream housing 75b are formed as components separate from each other and to be assembled by fitting. Thus, it is possible to easily adopt appropriate guide vanes 80 corresponding to the size of vanes 31 of the impeller wheel 7.

Moreover, as described above in reference to the first embodiment, the swirl-flow generating unit 76 has a functional effect of improving the surge margin by reducing the surge flow rate (the minimum flow rate) and of restricting decrease in the choking flow rate (the maximum flow rate), which also enables increasing the operation range of the compressor with a simplified structure.

Fifth Embodiment

Next, in reference to FIG. 9, the fifth embodiment will be described.

Fifth embodiment is different from the first embodiment in that the compressor housing 82 is not divided but has an integrated structure. Also, there is no recirculation flow path provided. The other configurations are the same as those of the first embodiment.

Figure 9:
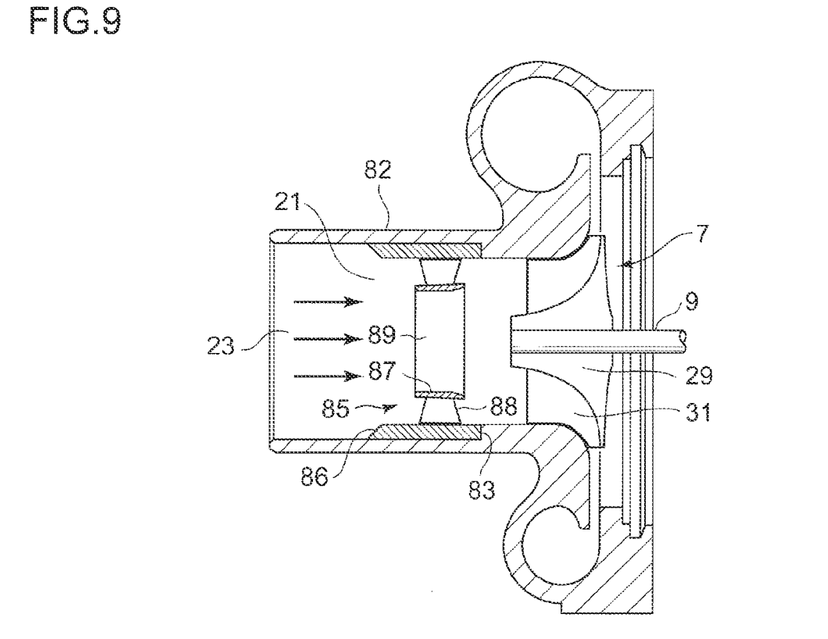
FIG. 9 is a partial cross-sectional view of the fifth embodiment, corresponding to FIG. 1.

As illustrated in FIG. 9, the compressor housing 82 includes the intake-air channel 21 for introducing the air not having been compressed to the impeller wheel 7, formed in the direction of the rotational axis line M and extending coaxially to have a cylindrical shape. Also, the intake-air inlet 23 which communicates with the intake-air channel 21 opens at the end of the intake-air channel 21.

A step portion 83 is formed on the inner circumferential wall of the intake-air channel 21 at the upstream side with respect to the impeller wheel 7. An outer cylindrical member 86 of a swirl-flow generating unit 85 is fitted to the inner circumferential wall, at the large-diameter side, of the step portion 83 from the intake-air inlet 23 side by means of fitting such as press fit. Also, the swirl-flow generating unit 85 includes an inner cylindrical member 87, guide vanes 88, and a central intake-air channel 89.

While the first embodiment includes the openings 61 for the recirculation flow path, the outer cylindrical member 86 of the swirl-flow generating unit 85 in the present invention has a merely cylindrical shape. Further, the inner circumferential wall of the outer cylindrical member 86 is flush with the inner circumferential wall at the small-diameter side, thereby forming the intake-air channel 21. Still further, the far end of the outer cylindrical member 86 is curved in order to reduce the flow resistance.

According to the fifth embodiment, the compressor housing 82 includes no circulation flow path and therefore easy to machine.

Further, while the compressor housing 82 is not a divided structure, it is possible to mount the swirl-flow generating unit 85 from the intake-air inlet 23 side by press fit or the like, which facilitates the assembling work.

Moreover, similarly to the first embodiment, the swirl-flow generating unit 85 has a functional effect of improving the surge margin and restricting decrease in the choking flow rate, which enables increase of the operation range of the compressor with a simplified structure.

INDUSTRIAL APPLICABILITY

According to the present invention, it is possible to provide guide vanes directly on the housing inner circumferential side in front of the impeller wheel without providing a center nose cone, so that it possible to improve the surge margin without reducing the choke flow, unlike the conventional techniques, to increase the operation range of a compressor. Thus, the present invention may be applied effectively to an exhaust turbocharger of an internal combustion engine.

REFERENCE SIGNS LIST

1 Exhaust turbocharger
7 Impeller wheel
9 Rotational shaft
15, 75, 82 Compressor housing (housing)
15a, 75a Upstream housing
15b, 75b Downstream housing
19 Centrifugal compressor
21 Intake-air channel
22 Inlet annular part
23 Intake-air inlet 25 Diffuser
27 Air channel of a spiral shape
29 Hub
31 Vane
31a Leading edge of a vane
31b Trailing edge of a vane
31c Outer circumferential edge of a vane (outer circumferential part)
41, 70, 98 Recirculation flow path
41a, 41b Circulation void (void)
43 Downstream opening end portion
45 Upstream opening end portion
51, 76, 85, 93 Swirl-flow generating unit
53, 77, 86 Outer cylindrical member
55, 80, 88, 96 Guide vanes (Swirl-flow generating part)
57, 79, 89 Central intake-air flow channel (central intake-air channel flow part)
71, 97 Slit-like void
61 Opening
M Rotational axis line
θ Inclination angle of guide vanes

The invention claimed is:

1. A centrifugal compressor, comprising:
a housing including an intake-air inlet which opens in a direction of a rotational axis of the centrifugal compressor, and an intake-air channel which connects to the intake-air inlet;
an impeller wheel disposed inside the housing rotatably around the rotational axis, and configured to compress intake gas which flows in from the intake-air inlet; and
a swirl-flow generating unit disposed between the intake-air inlet and the impeller wheel inside the housing and configured to swirl the intake gas which flows in from the intake-air inlet,
wherein the swirl-flow generating unit includes:
a swirl-flow generating part which includes a plurality of guide vanes disposed in a circumferential direction along an inner circumferential wall of the housing and which is configured to swirl the intake gas flowing in from the intake-air inlet around the rotational axis by means of the plurality of guide vanes; and
a central intake-air flow part which is a space surrounded by the swirl-flow generating part and which opens in the direction of the rotational axis so that the intake gas flowing in from the intake-air inlet passes through the central intake-air flow part,
wherein the housing includes a recirculation flow path which is disposed on an outer side of the intake-air channel and which brings an outer circumferential section of the impeller wheel into communication with the intake-air channel at an upstream side with respect to the impeller wheel,
wherein an opening end portion at an upstream side of the recirculation flow path is disposed upstream with respect to the swirl-flow generating unit, and return flow air from the opening end portion at the upstream side of the recirculation flow path flows toward the guide vanes of the swirl-flow generating part,
wherein the housing is divided into an upstream housing and a downstream housing at a position where the recirculation flow path is divided,
wherein the swirl-flow generating unit includes an outer cylindrical member to be fitted to the inner circumferential wall of the housing and the guide vanes arranged in a circumferential direction along an inner circumferential wall of the outer cylindrical member, the swirl-flow generating unit being formed as a separate body from the housing, and
wherein the outer cylindrical member is fitted to an inner circumferential wall of the upstream housing.

2. The centrifugal compressor according to claim 1,
wherein the central intake-air flow part is formed by a ring circular member which is disposed concentric with the rotational axis and which has a hollow center, and
wherein the guide vanes are arranged in a circumferential direction on an outer circumferential side of the ring circular member.

3. The centrifugal compressor according to claim 1,
wherein the recirculation flow path formed in the upstream housing has a far end portion extending toward the intake-air inlet, the far end portion communicating with an inner circumferential wall of the intake-air channel at a halfway position of the upstream housing without opening toward the intake-air inlet to form an annular slit-like void, so that a far end section of the upstream housing is formed as a single annular inlet part.

4. The centrifugal compressor according to claim 1,
wherein each of the upstream housing and the downstream housing which are halves of the divided housing includes a plurality of circulation voids constituting the recirculation flow path along a circumference centered at the rotational axis.

5. The centrifugal compressor according to claim 1,
wherein the upstream housing obtained which is a half of the divided housing includes a cylindrical slit-like void centered at the rotational axis constituting the recirculation flow path, and the downstream housing includes a plurality of circulation voids constituting the recirculation flow path along a circumference centered at the rotational axis.

6. The centrifugal compressor according to claim 1,
wherein the outer cylindrical member is fitted to the housing so that an outer circumferential wall of the outer cylindrical member forms an inner circumferential section of the recirculation flow path.

7. The centrifugal compressor according to claim 1,
wherein an inner diameter of the inner circumferential wall of the outer cylindrical member is larger than an inner diameter of the intake-air channel at a leading edge part of the impeller wheel.

8. The centrifugal compressor according to claim 7,
wherein the inner diameter of the inner circumferential wall of the outer cylindrical member is set so as to increase an area of a flow path corresponding to at least an area of the flow path which is reduced by the plurality of guide vanes blocking the flow path.

9. The centrifugal compressor according to claim 1,
wherein the outer cylindrical member includes an opening disposed on an upstream end side of the guide vanes, and the opening makes up the upstream opening end portion.

* * * * *